United States Patent
Prasad et al.

(10) Patent No.: US 12,198,439 B2
(45) Date of Patent: Jan. 14, 2025

(54) YARD MAPPING AND ASSET TRACKING SYSTEM

(71) Applicant: KoiReader Technologies, Inc., Dallas, TX (US)

(72) Inventors: Ashutosh Prasad, Dallas, TX (US); Vivek Prasad, Bengaluru (IN)

(73) Assignee: KoiReader Technologies, Inc., Dallas, TX (US)

( * ) Notice: Subject to any disclaimer, the term of this patent is extended or adjusted under 35 U.S.C. 154(b) by 0 days.

(21) Appl. No.: 18/641,560

(22) Filed: Apr. 22, 2024

(65) Prior Publication Data

US 2024/0265706 A1 Aug. 8, 2024

Related U.S. Application Data

(63) Continuation of application No. PCT/US2023/085650, filed on Dec. 22, 2023.

(60) Provisional application No. 63/583,111, filed on Sep. 15, 2023, provisional application No. 63/748,249, filed on Jan. 3, 2023.

(51) Int. Cl.
*G06V 20/52* (2022.01)
*H04N 23/695* (2023.01)

(52) U.S. Cl.
CPC .......... *G06V 20/52* (2022.01); *H04N 23/695* (2023.01)

(58) Field of Classification Search
None
See application file for complete search history.

(56) References Cited

U.S. PATENT DOCUMENTS

| | | | |
|---|---|---|---|
| 2018/0018627 A1 | 1/2018 | Justin et al. | |
| 2019/0050634 A1* | 2/2019 | Nerayoff | G07B 15/02 |
| 2019/0251842 A1* | 8/2019 | Wunder | G07C 5/008 |
| 2019/0294889 A1* | 9/2019 | Sriram | G06T 7/70 |
| 2019/0333233 A1 | 10/2019 | Hu et al. | |
| 2020/0218923 A1 | 7/2020 | Schimmel | |
| 2022/0267127 A1* | 8/2022 | Smith | B60D 1/665 |
| 2022/0274589 A1* | 9/2022 | Gao | G06F 3/04845 |
| 2023/0222912 A1* | 7/2023 | Barrett | G06Q 10/02 340/932.2 |

OTHER PUBLICATIONS

PCT Search Report and Written Opinion mailed for PCT Application No. PCT/US23/85650 from PCT Summary, 18 pages.

* cited by examiner

Primary Examiner — Leon Viet Q Nguyen
(74) Attorney, Agent, or Firm — Lee & Hayes, P.C.

(57) ABSTRACT

A system for generating a pixel map of a yard or facility in substantially real-time. The pixel map may be generated on-the-fly with virtual slots based on various vehicles and containers entering and exiting the yard or facility. In some cases, the pixel map may be utilized to track assets within the facility even if the physical identifier of the asset is unknown or the asset transitions between field of view of various image devices associated with the system.

18 Claims, 11 Drawing Sheets

YARD MAPPING AND ASSET TRACKING SYSTEM

CROSS-REFERENCE TO RELATED APPLICATIONS

This is a continuation of and claims priority to International Application No. PCT/US23/85650 filed on Dec. 22, 2023 and entitled "YARD MAPPING AND ASSET TRACKING SYSTEM" which claims priority to U.S. Provisional Application Nos. 63/478,249 filed on Jan. 3, 2023 and entitled "YARD CONTAINER AND ASSET TRACKING SYSTEM," and 63/583,111 filed on Sep. 15, 2023 and entitled "YARD MAPPING AND ASSET TRACKING SYSTEM," the entire contents of which are incorporated herein by reference.

BACKGROUND

Storage facilities, such as yards, distribution centers, ports, and the like, receive, process, store, and output vast quantities of assets and containers over time. In some cases, assets may become lost or misplaced within the yard. Conventional systems may utilize per container or asset tags which must be installed upon receipt of the container or asset and removed prior to output. However, affixing and removing asset tags is costly and time consuming.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
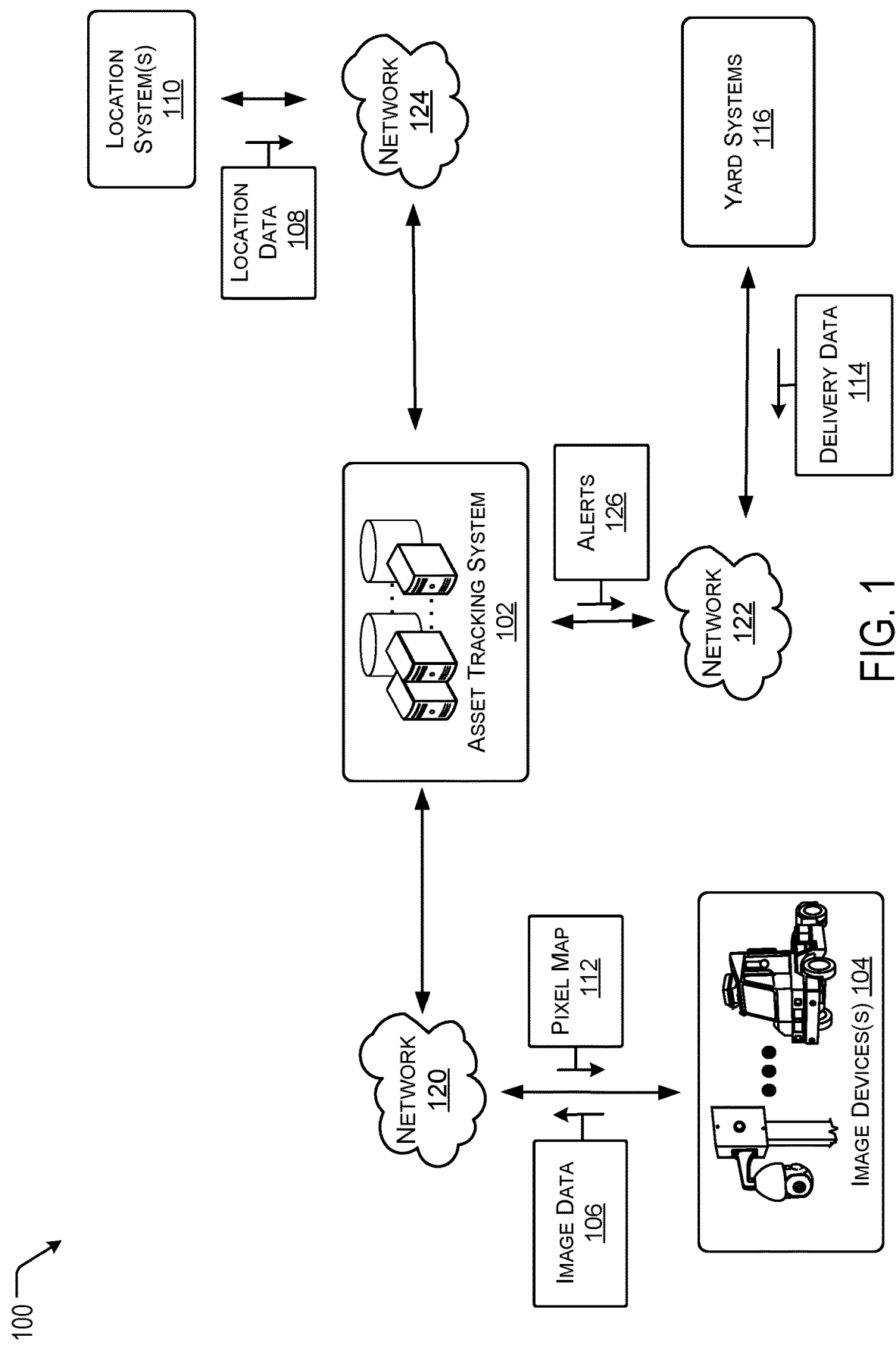
FIG. 1 is an example block diagram of an asset tracking system for mapping yards and tracking asset, according to some implementations.

Discussed herein are systems and devices for automating the tracking of positions of containers and assets as well as scheduling of events (such as delivery, loading, unloading, and storing of assets at a facility and/or yard). In some examples, an asset tracking system or platform may be configured to utilize one or more image devices (such as cameras, video devices, pan-tilt-zoom (PTZ) devices, 360 degree scanning systems, lidar system, and the like) to determine an identity and track a location of assets and/or containers as the assets and containers enter, exit, and are otherwise moved through a physical environment, such as a yard. For instance, the system may be configured to track assets and containers that are stored at the facility (e.g., at a preparation area, holding area, storage area, on the vehicles parked at the yard, and the like).

In some cases, the asset tracking system may be configured to generate a pixel map or mapping representative of the physical environment based on image data received from the one or more image devices positioned throughout the physical environment. The pixel map may be configured to represent physical slots (e.g., actual slots, lanes, or areas in the physical environment, such as parking spaces, painted regions, and the like) and/or virtual slots or regions (e.g., current locations of agents, vehicles, containers, or the like that are not indicated in the physical environment). The system may track identifiers including physical identifiers on the agents and/or virtual identifiers assigned by the asset tracking system. In this manner, the system may track locations of assets and/or agents within the physical environment, such as prior to unloading at a dock.

In some cases, the asset tracking system may also track assets and containers as the assets and containers are moved about the yard, loaded and/or unloaded from one or more vehicles, and the like. For instance, the asset tracking system may receive sensor data associated with assets and/or containers as the assets and/or containers enter the yard, are delivered to designated storage locations, and/or exit the yard. For example, the sensor data may be received from one or more pan-tilt-zoom (PTZ) image devices and/or fixed wide view, 360 degree view, fisheye, and/or other types of fixed image device positioned within the yard. As another example, the one or more image devices may be installed on a yard mule or other facility or yard equipment and, accordingly, moveable within the physical environment. In some implementations, the system may receive position data, such as global positioning system (GPS) data associate with the yard mule or mobile image device and/or BGPS data associated with the physical environment to supplement the accuracy of the GPS data with regards to the physical environment.

In some cases, the image data from the fixed image devices may be utilized to determine a slot (either physically or defined in substantially real-time as a virtual slot) associated with an incoming assets (e.g., vehicle, container, or the like). The image data from the fixed image devices may also be used to assign a virtual identifier used to track the asset until a slot is assigned. The PTZ or adjustable image devices as well as the mobile image devices may then generate image data usable to extract data, such as physical identifiers, from the assets at the slot or other defined region.

In some cases, the pixel map may be a virtual map, grid, or other type of location mapping associated with the physical environment. The pixel map may be portioned into one or more regions and each region may be associated with a storage location for assets that may be present in the physical environment or defined virtually within the pixel map by the system based on a placement of the asset. The virtual slots may be defined when an asset remains fixed for greater than a predetermined period of time or is otherwise determined to be parked or in storage). In some cases, the pixel map may generate a historical record of the flow of assets and/or containers into and out of the physical environment. The historical record or data may then be used to assist in scheduling of departures and/or arrivals of additional assets, such as via, one or more machine learned models.

The pixel map may also be used to generate a delivery schedule or estimated wait time for drivers (or other delivery personal) arriving at the facility with a delivery as well as a pickup schedule or estimated wait time for drivers waiting on assets to deliver to another location. In some cases, the asset tracking system may include a display located at a waiting area or entry area of the yard indicating scheduling data, such as wait time and availability of empty yard regions. In other cases, the schedule data may be provided to a user device, such as a smart phone, via, for example, a web-interface, cloud-based service interface, downloadable application, or the like.

In one specific example, the asset tracking system may also receive delivery data from the delivery vehicles, such as estimated arrival times, other delivery locations (such as when multiple stops or facilities are associated with a single delivery job or the like), location data, identifying data, and the like. The asset tracking system may combine the delivery data with the asset data or the pixel map data to provide scheduling adjustments for individual delivery vehicles. For example, the asset tracking system may adjust an order of the deliveries at one or more locations or facilities, such that the delivery vehicle may arrive at a time when the yard has at least one open region for receiving the assets and/or containers.

In this manner, the asset tracking system may more efficiently manage deliveries across multiple facilities or physical environments. In this manner, the asset tracking system may have pixel or virtual map data and vehicle delivery data as well as a status and location (e.g., region) for each asset on premise, arriving, and/or departing the yard during operations (e.g., in substantially real-time). Accordingly, the scheduling system discussed herein may estimate (such as via one or more machine learned models) operation times associated with each unloading and loading event based on the type of operation, the location of the assets, and the like. The system may also determine location and/or accessibility of the assets (e.g., is the asset within a container at the bottom of a vertical stack of containers) and/or alternative assets (e.g., more accessible assets) based on virtual map data and associated region.

The asset tracking system may then schedule use of the loading and unloading areas (e.g., the bay doors) based on an optimization to improve the overall flow of assets in and out of the yard. In some case, the virtual map may be used as an input to one or more machine learned models that may output or update the delivery schedule as a response to updates to the virtual map in substantially real-time. In these cases, the one or more machine learned models may be trained on scheduling data, estimated arrival times, location data together with map data, and virtual map data together with associated metrics (e.g., occupancy type metrics, personnel and equipment metrics, asset metrics, vehicle metrics, and the like).

As an example, the system may utilize one or more occupancy metrics associated with the pixel or virtual map (e.g., fullness, total capacity, variable capacity, and the like) together with individual slot metrics (e.g., available size, vertical stacking capacity, accessibility, and the like) as well as the delivery schedule (e.g., incoming asset schedule, estimated time to arrival, shipment size, and the like), the shipping schedule (exiting asset schedule, estimated time to arrival, shipment size, and the like), asset characteristics (e.g., size, weight, dimensions, demand, estimated storage times, and the like) to determine or update the delivery schedule for one or more incoming or outgoing shipments. For instance, the system may re-route vehicles to other facilities if the capacity metric exceeds one or more thresholds, if the incoming assets fail to fit in any available region space, or the facility has low accessibility. In some cases, the system may schedule facility events (e.g., moving assets, rearranging assets, breaking down assets, shelving assets, unloading/loading of assets, packaging of assets, processing assets, and the like) to adjust the current position of stored or existing assets within the facility to accommodate incoming shipments or reduce processing time with outgoing shipments. In this manner, the system may maintain a real-time on-the-fly schedule for incoming and outgoing shipments.

In some cases, since the image and/or sensor data received may be from different sources or types of devices at different ranges and generalities, the asset tracking system may perform a data normalization using techniques such as threshold-based data normalization and machine learning techniques (e.g., feature identification, segmentation, classification, and the lie) to identify the driver, vehicle, container, or other physical identifiers. It should be understood that the asset tracking system may utilize different weighted averages or thresholds based on the data source (e.g., sensor type, location, distance, and position), the current weather (e.g., sunny, rainy, snowy, or foggy), and time of day when performing data normalization. In some cases, machine learning models may also be applied to remove the distortion from images caused by rain, dust, sand, fog, and the like as well as to brighten the sensor and/or images shot in low-light or dark conditions. These machine learning models may be trained using weather data, image data representing various weather conditions and times of day, and the like.

As described herein, the machine learned models may be generated using various machine learning techniques. For example, the models may be generated using one or more neural network(s). A neural network may be a biologically inspired algorithm or technique which passes input data (e.g., image and sensor data captured by the IoT computing devices) through a series of connected layers to produce an output or learned inference. Each layer in a neural network can also comprise another neural network or can comprise any number of layers (whether convolutional or not). As can be understood in the context of this disclosure, a neural network can utilize machine learning, which can refer to a broad class of such techniques in which an output is generated based on learned parameters.

As an illustrative example, one or more neural network(s) may generate any number of learned inferences or heads from the captured sensor and/or image data. In some cases, the neural network may be a trained network architecture that is end-to-end. In one example, the machine learned models may include segmenting and/or classifying extracted deep convolutional features of the sensor and/or image data into semantic data. In some cases, appropriate truth outputs of the model in the form of semantic per-pixel classifications (e.g., vehicle identifier, container identifier, driver identifier, and the like).

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like. In some cases, the system may also apply Gaussian blurs, Bayes Functions, color analyzing or processing techniques and/or a combination thereof.

FIG. 1 is an example block diagram 100 of an asset tracking system 102 for mapping yards and tracking assets, according to some implementations. In the current example, image devices 104 may be arranged through a physical environment, such as a yard or dock of a distribution facility, to provide image data 106 (or other sensor data) of the physical environment. In some cases, the image devices 104 may include at least two fixed image devices and at least two adjustable image devices (such as PTZ devices), and a mobile image device (such as a fixed image device mounted on a yard mule). For example, the fixed image devices may be configured to monitor the entire area associated with the yard, the adjustable image devices may be configured to capture identity data from the assets once parked or at least temporarily stored at a region within the physical environment, and the mobile image device may be usable to capture identity data from assets that may be obstructed from the field of view of the adjustable image devices. In some cases, the asset tracking system 102 may also utilize image data 106 from additional image devices, such as image devices associated with a congested region of the physical environment.

The asset tracking system 102 may also receive location data 108 from one or more location systems 110 associated with the physical environment and/or the image devices 104. In some cases, the image devices 104 may include one or more fixed image devices (such as a PTZ image device or birds-eye-view camera, 360 degree view camera, or the like) together with one or more mobile image device (such as affixed to a mobile yard mule, personnel, other yard equipment, or the like). In this manner, the image devices 104 may be a system of image devices including at least one fixed image device and at least one mobile image device. As one example, the yard mule or mobile image devices may include a GPS system that provides a first location data and the physical environment may also be equipped with a device, such as a BGPS, to improve the accuracy of the first location data, such that the system 102 may determine a location or region at which the image data 106 from the mobile image devices 104 are generated and/or captured.

The asset tracking system 102 may utilize the image data 106 from the various image devices 104 to determine a region associated with an asset, such as a region at which the asset is parked or stored. For example, the asset tracking system 102 may generate a pixel map 112 of the physical environment including a mapping of pixels to regions. Each of the image devices 104 may have downloaded or have access to the pixel map 112. In this manner, as the asset enters the physical environment a first image device may assign a virtual identifier to the asset. The system 102 may then track the asset as the asset moves within the physical environment based at least in part on the virtual identifier. At some instances, the asset may move out of the field of view of the first image device and into a field of view of a second image device. The second image device may utilize the pixel map 112 to identify the asset and the virtual identifier and, thereby, continue to track the asset within the physical environment.

In some cases, as the asset is parked or stored, the system 102 may determine based on the pixel map a region or location associated with the asset. The system 102 may then cause one of the adjustable image devices and/or the mobile image devices to capture or generate additional image data 106 associated with the asset. The additional image data 106 may be of high resolution such that any physical markings or identifiers on the asset may be extracted by the asset tracking system 102 using the additional image data 106. The asset tracking system 102 may then assign a physical identifier in lieu of or in addition to the virtual identifier to the asset. The system 102 may also record that the asset is stored at the region according to the pixel map 112, such that the asset may be more easily located in the future, thereby improving distribution operations of the physical environment or facility. In some cases, the pixel map 112 may correspond to the physical environment by a pixel translation from the pixel map 112 to the physical environment. In this manner, the pixel map 112 may provide a physical identifier or physical location within the physical environment in response to a query of an asset's location based at least in part on the pixel location or region of the asset within the pixel map 112 and the pixel translation.

In some cases, once the physical identifier for an asset is determined, the system 102 may access delivery data 114 from another yard system 116. The system 102 may then assign specific items or additional information to the region within the pixel map 112 or otherwise associated the asset with the delivery data 114. In some cases, the delivery data 114 for an asset may include an inventory of items associated with the asset, third party customer data, shipping data, customs data, special storage instructions (such as refrigeration, perishability data, and the like), and the like.

In some cases, the asset tracking system 102 may send alerts 126 to various yard systems 116 in order to provide instructions, location data of assets, plan events, and the like for the various equipment and personnel operating within the yard or facility. In some cases, the alerts 126 may be instructions to cause the yard mule or mobile image device 104 to move to a particular location and capture image data at a particular slot or region within the yard or facility in order to generate higher quality image data at, for instance, a higher resolution for further processing, such as determining a physical identifier of the asset. In this manner, the asset tracking system 102 may provide detailed instructions (e.g., angles, positions, camera intrinsics or parameters, mule position, and the like) in order to capture image data of specific features of the assets.

In the current example, the data, alerts, maps, instructions, and the like may be transmitted between various systems using networks, generally indicated by 120-124. The networks 120-124 may be any type of network that facilitates compunction between one or more systems and may include one or more cellular networks, radio, WiFi networks, short-range or near-field networks, infrared signals, local area networks, wide area networks, the internet, and so forth. In the current example, each network 120-124 is shown as a separate network but it should be understood that two or more of the networks may be combined or the same.

FIGS. 2-7 are flow diagrams illustrating example processes associated with the scheduling system discussed herein. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processor(s), perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 2:
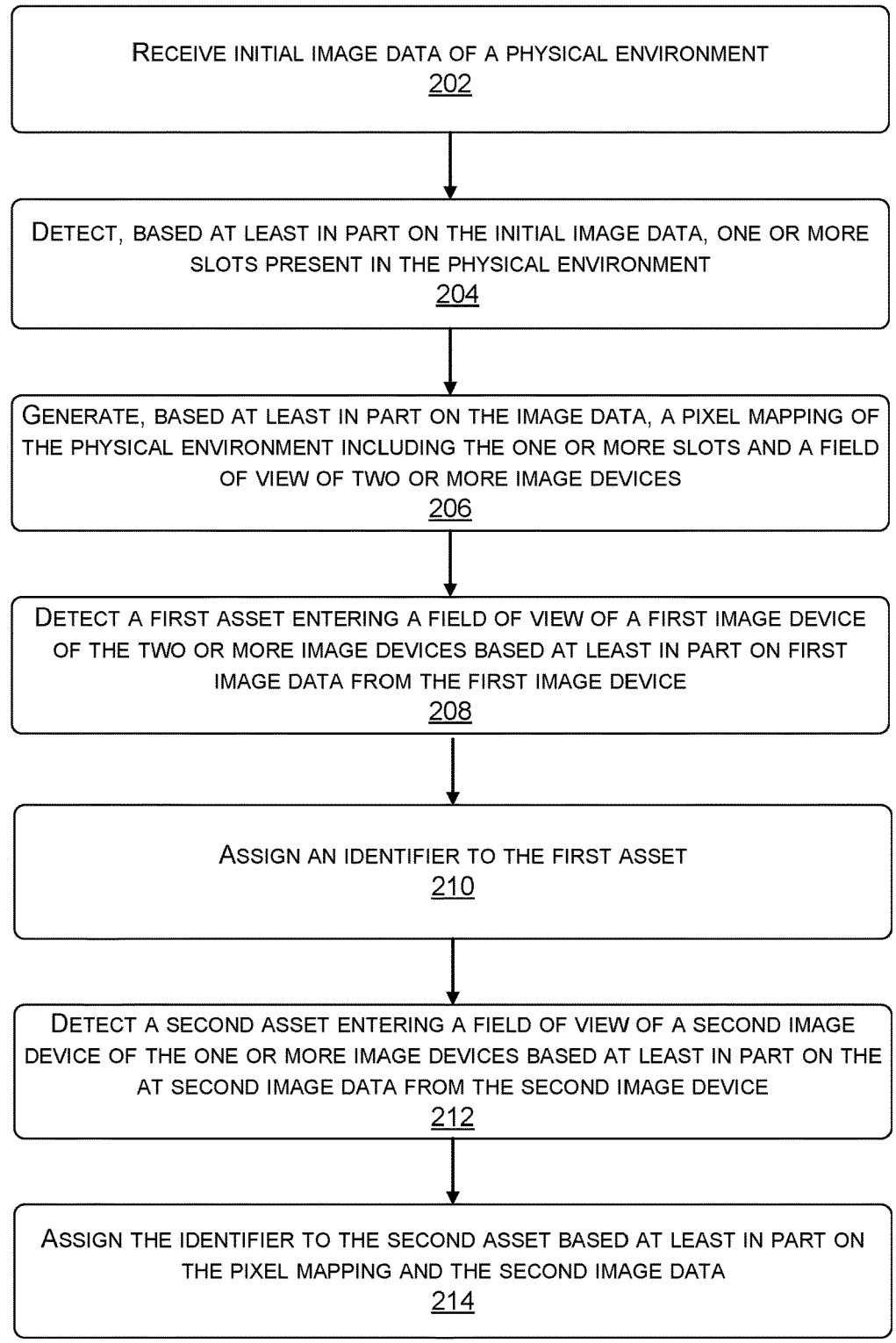
FIG. 2 is a flow diagram illustrating an example process associated with the asset tracking system of FIG. 1, according to some implementations.

FIG. 2 is a flow diagram illustrating an example process 200 associated with the asset tracking system of FIG. 1, according to some implementations. As discussed herein, the asset tracking system may be configured to automate tracking of assets within a physical environment without use of per asset tags or manual inventory/asset records. For example, many conventional systems may require an asset tag to be attached to each asset and/or container as the asset or container enters the physical environment and removed as each asset or container exits the physical environment. In these conventional systems, a scanner configured to detect the asset tags within the yard can be used to identify the desired asset or container. However, attaching and removing the tags as well as traversing the physical environment to detect the asset requires significant resources (e.g., personnel and hardware) and time (e.g., in scanning the yard for a specific or desired asset).

As an alternative to the conventional systems, the asset tracking system discussed herein, may track and store location data associated with assets within the physical environment without the need to attach tags to specific assets or containers and without requiring a personnel to search the physical environment for the asset, thereby improving speed of operations, accuracy and visibility of data associated with assets stored within the physical environment (such as a yard), and reducing overall operational costs.

At 202, the asset tracking system may receive initial image data associated with a physical environment. The initial image data may be from a plurality of image devices either installed with respect to the physical environment or mobile, such as on the yard mule, as discussed above. In the current example, image data is received by the asset tracking system, however, it should be understood that, in some alternative embodiments, additional sensor data may also be received and utilized in lieu of or in addition to the image data.

At 204, the asset tracking system may detect, based at least in part on the initial image data, one or more slots present in the physical environment. For example, the system may detect painted lines, such as parking slots or spaces, painted regions, such as areas with different line layouts (e.g., parallel, crisscross, cross hatching, dotted, or other patterns), and the like. The system may also detect coned regions (e.g., temporary and physically defined regions that may be adjusted by yard personnel), regions defined by adjacent structures (such as dock doors, lifts, cranes, and the like), regions separated by walls or series of pillars, and the like.

At 206, the asset tracking system may generate (or update, such as based on detection of a change in the painted regions, coned regions, or the like), based at least in part on the image data, a pixel mapping of the physical environment including the one or more slots and a field of view of two or more image devices. For example, the system may generate a pixel map of the physical environment that may extend through the field of view of the two or more image devices. The pixel map may also include one or more pixels assigned to each of the regions defined based on the detected regions in the physical environment, as discussed herein.

At 208, the asset tracking system may detect a first asset entering a field of view of a first image device of the two or more image devices based at least in part on first image data from the first image device. For example, the first image device may be associated with a gate or check in area of the physical environment. As a vehicle, such as a delivery vehicle, arrives at the physical environment via the gate or check in area, the first image device may capture the first image data (at a first time) of the vehicle or a container associated with the vehicle (e.g., the asset). The asset tracking system may segment and classify the first image data using one or more machine learned models to detect the asset within the first image data. In some cases, the system may also utilize the one or more machine learned models to extract feature data associated with the asset from the first image data.

At 210, the asset tracking system may assign an identifier to the first asset. For example, the system may assign a virtual identifier usable by the system to track the first asset throughout the environment via the two or more image devices. For example, the virtual identifier may be assigned based on a feature of the first asset detected at 208, such as vehicle, container, size or other dimension(s), number of wheels, and the like. In some cases, the virtual identifier may be assigned based on a first come first serve basis and recycled when the corresponding asset exits the physical environment.

At 212, the asset tracking system may detect a second asset entering a field of view of a second image device of the one or more image devices based at least in part on the at second image data from the second image device. For example, the second image device may be positioned around a corner or other area that is outside the field of view of the first image device. Again, the asset tracking system may segment and classify the second image data using one or more machine learned models trained on image data including assets, vehicles, and the like to detect the second asset within the second image data. In some cases, the system may also utilize the one or more machine learned models trained on image data including assets, vehicles, and the like to extract feature data associated with the second asset from the second image data.

At 214, the asset tracking system may assign the identifier to the second asset based at least in part on the pixel mapping and the second image data. For example, the first asset and the second asset may be the same. In these examples, the system and/or the second image device (such as via an edge computing device) may determine that the first asset is the same as the second asset based on the pixel mapping (e.g., the pixels associated with the first asset correspond to the pixels associated with the second asset within a threshold period of time). Once, the system determines that the first asset is the same as the second asset, the system may assign the virtual identifier to the second asset demarking the second asset as the first asset. In this manner, the system may track the asset over the field of view of multiple image devices of the two or more image devices without performing resource intensive feature mapping, thereby improving operational time and reducing computational resource costs.

Figure 3:
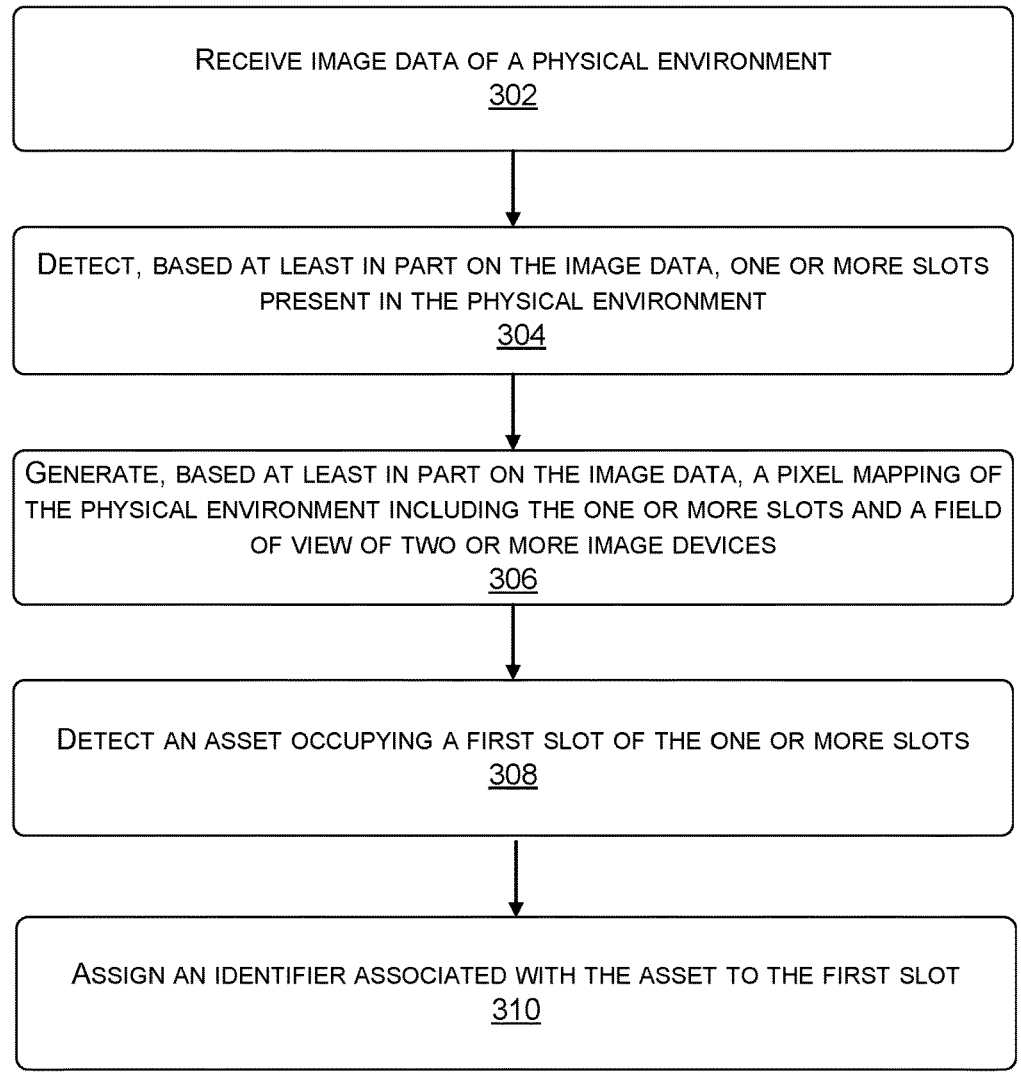
FIG. 3 is another flow diagram illustrating an example process associated with the asset tracking system of FIG. 1, according to some implementations.

FIG. 3 is another flow diagram illustrating an example process 300 associated with the asset tracking system of FIG. 1, according to some implementations. As discussed herein, the asset tracking system may be configured to automate tracking of assets within a physical environment without use of per asset tags or manual inventory/asset records. For example, the asset tracking system discussed herein, may track and store location data associated with assets within the physical environment without the need to attach tags to specific assets or containers and without requiring a personnel to search the physical environment for the asset, thereby improving speed of operations, accuracy and visibility of data associated with assets stored within the physical environment (such as a yard), and reducing overall operational costs.

At 302, the asset tracking system may receive initial image data associated with a physical environment. The initial image data may be from a plurality of image devices either installed with respect to the physical environment or mobile, such as on the yard mule as discussed above. In the current example, image data is received by the asset tracking system, however, it should be understood that, in some alternative embodiments, additional sensor data may also be received and utilized in lieu of or in addition to the image data.

At 304, the asset tracking system may detect, based at least in part on the initial image data, one or more slots present in the physical environment. For example, the system may detect painted lines, such as parking slots or spaces, painted regions, such as areas with different line times (e.g., parallel, crisscross, cross hatching, dotted, or other patterns), and the like. The system may also detect coned regions, regions defined by adjacent structures (such as dock doors, lifts, cranes, and the like), regions separated by walls or series of pillars, and the like.

At 306, the asset tracking system may generate, based at least in part on the image data, a pixel mapping of the physical environment including the one or more slots and a field of view of two or more image devices. For example, the system may generate a pixel map of the physical environment that may extend through the field of view of the two or more image devices. The pixel map may also include one or more pixels assigned to each of the regions defined based on the detected regions in the physical environment, as discussed herein.

At 308, the asset tracking system may detect an asset occupying a first slot of the one or more slots represented in the pixel mapping. For example, the asset may be detected within the image data and assigned to the first slot based on a majority, defined percentage (e.g., 25%, 50%, 75%, 90%, or the like), or threshold number of pixels corresponding to the slot being occupied by the asset within the image data.

At 310, the asset tracking system may assign an identifier associated with the first asset to the first slot. For example, the identifier may be a virtual identifier assigned when the asset entered the physical environment. In some cases, the system may also assign a physical identifier extracted from the image data representing the asset to the slot. For instance, the physical identifier may be a license plate, vehicle number, customer number, container number, customs clearance data, other governmental identifier, or the like. In some cases, by assigning the identifier to the slot, the system may allow the asset to be more easily located when the asset is to be retrieved, moved, unloaded, loaded, or the like thereby improving the efficiency of the operations associated with the physical environment. In some embodiments, the slot identifier may also be assigned to the asset and/or a location associated with the slot may also be assigned to the asset. Again, in this manner, the system allows for reduced complexity and a reduction in operational time associated with locating the asset within the physical environment.

Figure 4:
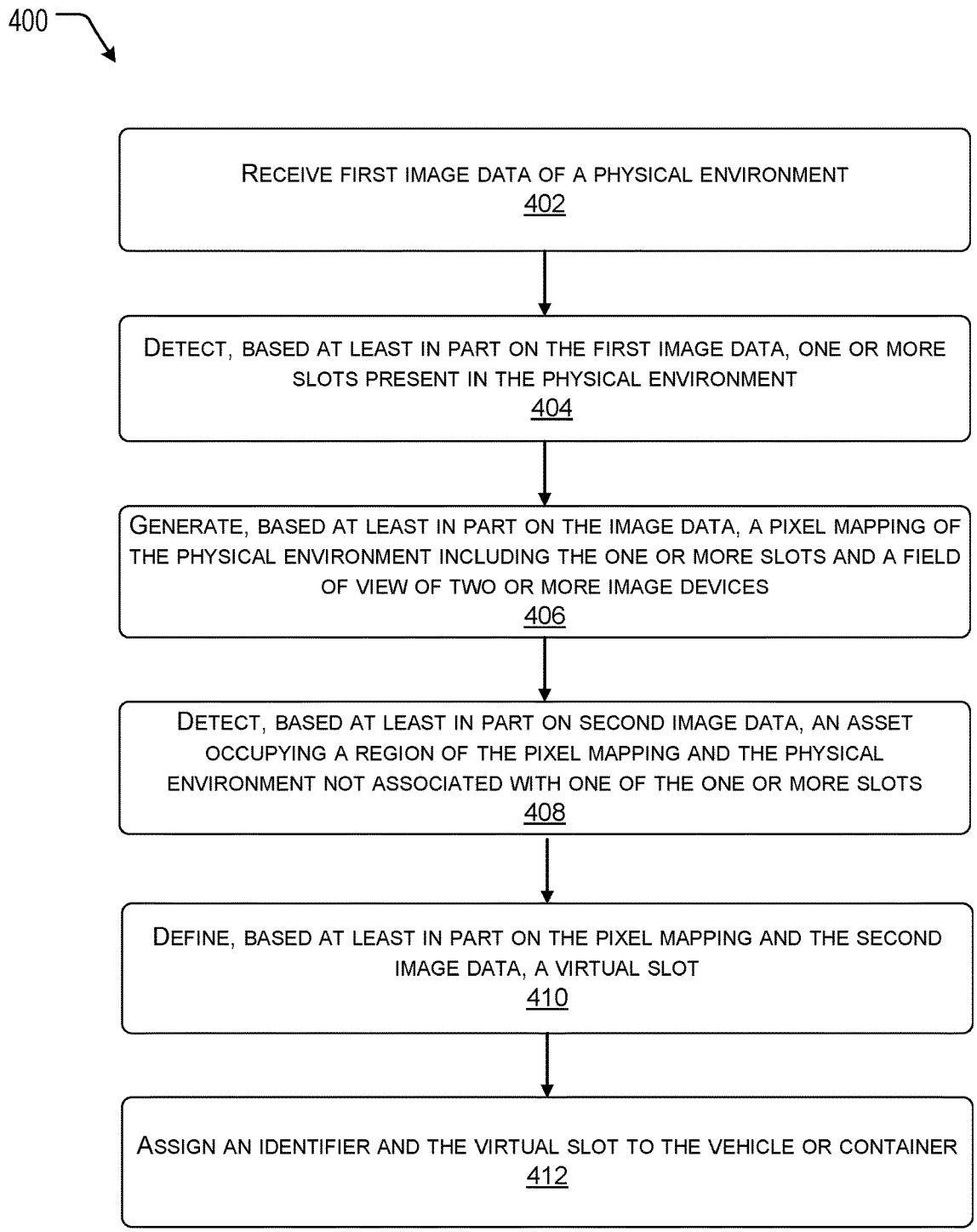
FIG. 4 is another flow diagram illustrating an example process associated with the asset tracking system of FIG. 1, according to some implementations.

FIG. 4 is another flow diagram illustrating an example process 400 associated with the asset tracking system of FIG. 1, according to some implementations. As discussed herein, the asset tracking system may be configured to automate tracking of assets within a physical environment without use of per asset tags or manual inventory/asset records. For example, the asset tracking system discussed herein, may track and store location data associated with assets within the physical environment without the need to attach tags to specific assets or containers and without requiring a personnel to search the physical environment for the asset, thereby improving speed of operations, accuracy and visibility of data associated with assets stored within the physical environment (such as a yard), and reducing overall operational costs.

At 402, the asset tracking system may receive initial image data associated with a physical environment. The initial image data may be from a plurality of image devices either installed with respect to the physical environment or mobile, such as on the yard mule as discussed above. In the current example, image data is received by the asset tracking system, however, it should be understood that, in some alternative embodiments, additional sensor data may also be received and utilized in lieu of or in addition to the image data.

At 404, the asset tracking system may detect, based at least in part on the initial image data, one or more slots present in the physical environment. For example, the system may detect painted lines, such as parking slots or spaces, painted regions, such as areas with different line layouts (e.g., parallel, crisscross, cross hatching, dotted, or other patterns), and the like. The system may also detect coned regions, regions defined by adjacent structures (such as dock doors, lifts, cranes, and the like), regions separated by walls or series of pillars, and the like.

At 406, the asset tracking system may generate, based at least in part on the image data, a pixel mapping of the physical environment including the one or more slots and a field of view of two or more image devices. For example, the system may generate a pixel map of the physical environment that may extend through the field of view of the two or more image devices. The pixel map may also include one or more pixels assigned to each of the regions defined based on the detected regions in the physical environment, as discussed herein.

At 408, the asset tracking system may detect, based at least in part on second image data, an asset occupying a region of the pixel mapping and the physical environment not associated with one of the one or more slots. For example, the asset may be a vehicle that is parked along the side of a roadway within the physical environment, on the curb, or other location that is not typically used for parking. In some cases, the system may determine the asset is not associated with one or more slots when more than a threshold number of pixels within the second image data do not correspond to a slot within the pixel mapping.

At 410, the asset tracking system may define, based at least in part on the pixel mapping and the second image data, a virtual slot and, at 412, the asset tracking system may assign an identifier and the virtual slot to the vehicle or container. For example, the system may assign pixels within the pixel mapping corresponding to pixels representing the asset within the second image data to the virtual slot within the pixel mapping. In this manner, the system may generate slots within the pixel mapping for use in tracking, locating, and inventorying assets that may end up in overflow areas, failing to fit within the dimensions of predefined slots within the physical environment, or that are not properly stored. In some cases, the virtual slot may continue to exist within the pixel mapping until the assets are moved from the current stored locations.

In some implementations, the creation and tracking of the virtual slots within the pixel mapping of the physical environment may allow the operators of the facility associated with the physical environment to store assets in defined locations without requiring permanent slots or storage areas. In this manner, the system may allow for a more flexible use of yard space or the like than in conventional distribution facilities with fixed or permanently demarked storage area.

Figure 5:
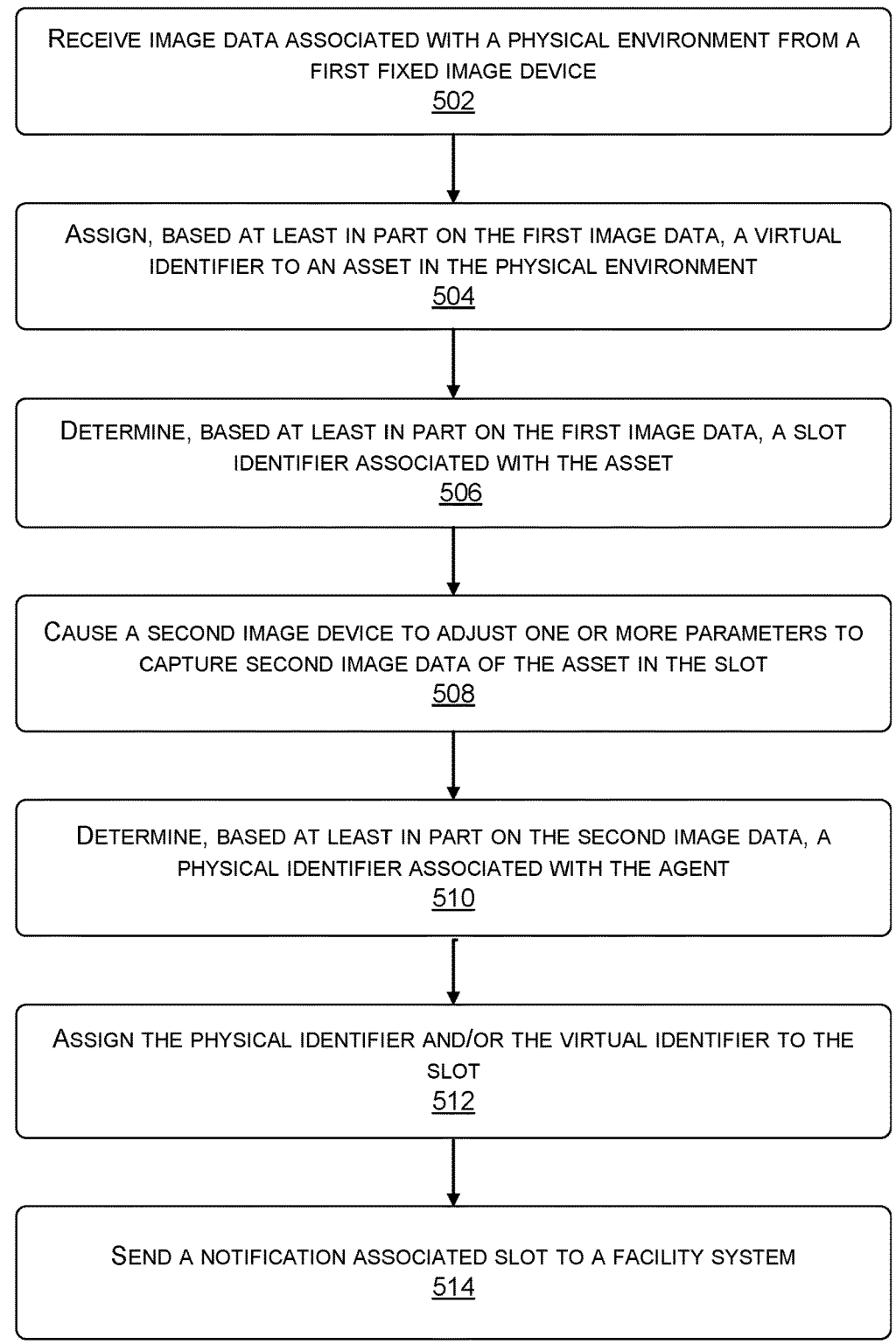
FIG. 5 is another flow diagram illustrating an example process associated with the asset tracking system of FIG. 1, according to some implementations.

FIG. 5 is another flow diagram illustrating an example process 500 associated with the asset tracking system of FIG. 1, according to some implementations. As discussed herein, the asset tracking system may be configured to automate tracking of assets within a physical environment without use of per asset tags or manual inventory/asset records. For example, the asset tracking system discussed herein, may track and store location data associated with assets within the physical environment without the need to attach tags to specific assets or containers and without requiring a personnel to search the physical environment for the asset, thereby improving speed of operations, accuracy and visibility of data associated with assets stored within the physical environment (such as a yard), and reducing overall operational costs.

At 502, the asset tracking system may receive image data associated with a physical environment from a fixed image device. For example, the fixed image device may be associated with a gate or check in area of the physical environment. As an asset, such as a delivery vehicle, arrives at the physical environment via the gate or check in area, the fixed image device may capture the image data (at a first time) of the asset. The asset tracking system may segment and classify the first image data using one or more machine learned models to detect the asset within the first image data. In some cases, the system may also utilize the one or more machine learned models to extract feature data associated with the asset from the first image data.

At 504, the asset tracking system may assign, based at least in part on the first image data, a virtual identifier to an agent in the physical environment. For example, as the asset enters the physical environment the system may assign a virtual identifier as a physical identifier of the asset may not be known. In some cases, the virtual identifier may be generated based on a determined feature of the asset, type or class of the asset, dimensions of the asset, an enter location of the asset to the physical environment, or the like.

At 506, the asset tracking system may determine, based at least in part on the first image data, a slot identifier associated with the asset. For example, the asset may park or be otherwise stored at the location in the physical environment associated or assigned to the slot based on one or more pixel mappings, as discussed herein.

At 508, the asset tracking system may cause a second image device to adjust one or more parameters (such as zoom, pan, tilt, focus, or the like) to capture second image data of the asset in the slot and, at 510, the asset tracking system may determine, based at least in part on the second image data, a physical identifier associated with the agent. For instance, the second image device may be configured to take high quality or high resolution images of the asset while the asset is within the slot or as the asset was located or positioned within the slot. In some cases, the second image devices may be fixed and caused to adjust a field of view to capture the second image data while, in other cases, the second image device may be mobile and may be moved (e.g., either by a user or via an autonomous controls) to a position to capture the second image data of the asset. The system may then determine a physical identifier associated with the asset based at least in part the second image data, such as for example, via one or more machine learned models.

At 512, the asset tracking system may assign the physical identifier and/or the virtual identifier to the slot. For example, in addition to assigning the virtual identifier and the physical identifier to the asset, the system may also assign the virtual identifier and the physical identifier to the slot occupied by the asset.

At 514, the asset tracking system may send a notification about the associated slot to a facility system. For example, the system may send a notification that the asset has been received, processed, and/or stored to a facility system. In some cases, sending the notification may include updating a facility database, datastore, spread sheet or table, map, or the like.

Figure 6:
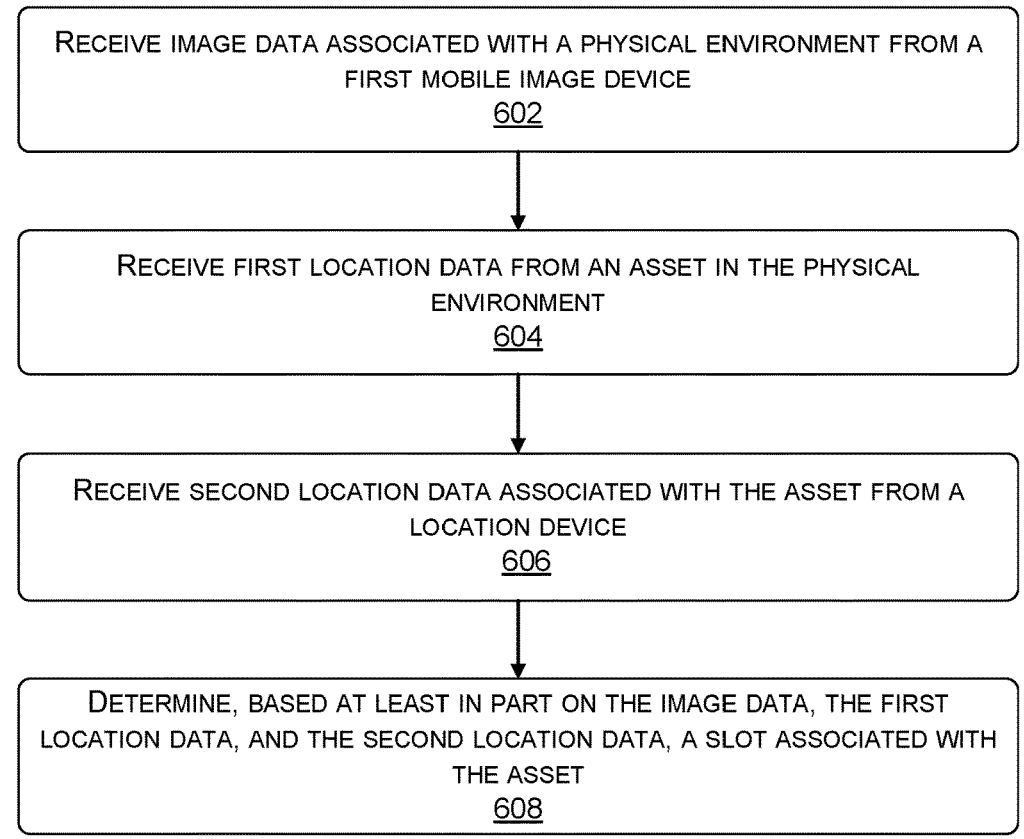
FIG. 6 is another flow diagram illustrating an example process associated with the asset tracking system of FIG. 1, according to some implementations.

FIG. 6 is another flow diagram illustrating an example process 600 associated with the asset tracking system of FIG. 1, according to some implementations. As discussed herein, the asset tracking system may be configured to automate tracking of assets within a physical environment without use of per asset tags or manual inventory/asset records. For example, the asset tracking system discussed herein, may track and store location data associated with assets within the physical environment without the need to attach tags to specific assets or containers and without requiring a personnel to search the physical environment for the asset, thereby improving speed of operations, accuracy and visibility of data associated with assets stored within the physical environment (such as a yard), and reducing overall operational costs.

At 602, the asset tracking system may receive image data associated with a physical environment from a fixed image device. For example, the fixed image device may be associated with a gate or check in area of the physical environment. As an asset, such as a delivery vehicle, arrives at the physical environment via the gate or check in area, the fixed image device may capture the image data (at a first time) of the asset. The asset tracking system may segment and classify the first image data using one or more machine learned models to detect the asset within the first image data. In some cases, the system may also utilize the one or more machine learned models trained on image data of assets in various physical environments to extract feature data associated with the asset from the first image data.

At 604, the asset tracking system may receive first location data from an asset in the physical environment. For example, the system may receive global position satellite (GPS) data from the asset, a mobile image device, or the like. The first location data may be of a first accuracy or range. For example, the first location data may be accurate up to a predetermined number of meters (e.g., 10 meters, 5 meters, 3 meters, 1 meter, or the like).

At 606, the asset tracking system may receive second location data from a location device in the physical environment. For example, the location device may be a BGPS system or other device that may be used to improve the accuracy of the first location data. In this manner, the first location data may become more accurate up to a predetermined number of meters (e.g., 1 meter, 0.5 meters, 0.3 meters, 0.1 meters, or the like).

At 608, the asset tracking system may determine, based at least in part on the image data, the first location data, and the second location data, a slot associated with the asset. For example, by using the second location data to improve the accuracy of the first location data, the system may more accurately and with more specificity determine a slot associated with a pixel mapping of the physical environment that is occupied by the asset, even when an image data associated with the asset and/or the slot is obstructed.

Figure 7:
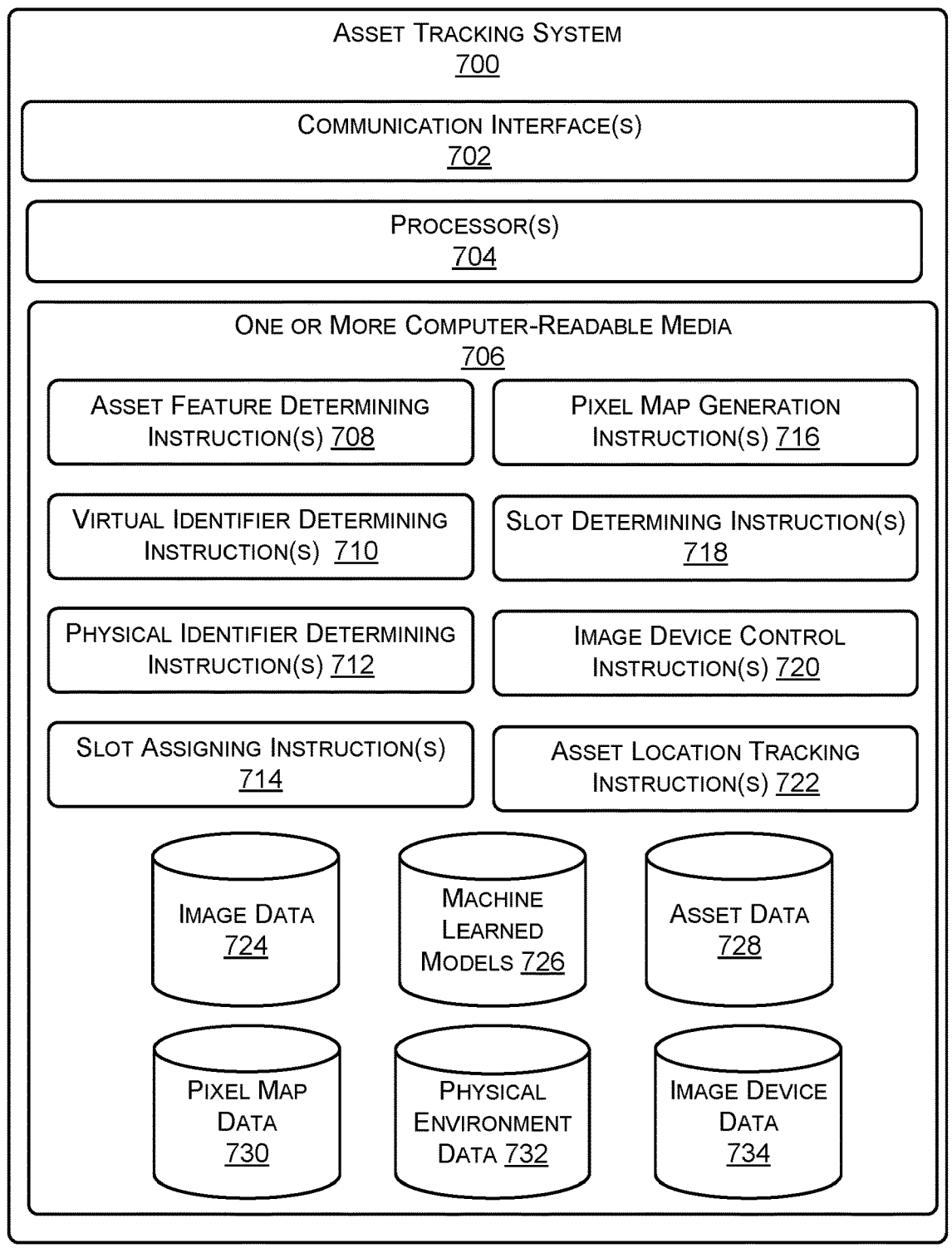

FIG. 7 is an example asset tracking system 700 that may implement the techniques described herein according to some implementations. The asset tracking system 700 can include one or more communication interface(s) 702 that enable communication between the asset tracking system 700 and one or more other local or remote computing device(s) or remote services, such as a the PTZ image devices, fixed image devices, and/or mobile image devices. For instance, the communication interface(s) 702 can facilitate communication with other proximate sensor systems and/or other facility systems. The communications interfaces(s) 702 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

The asset tracking system 700 may include one or more processors 704 and one or more computer-readable media 706. Each of the processors 704 may itself comprise one or more processors or processing cores. The computer-readable media 706 is illustrated as including memory/storage. The computer-readable media 706 may include volatile media (such as random access memory (RAM)) and/or nonvolatile media (such as read only memory (ROM), Flash memory, optical disks, magnetic disks, and so forth). The computer-readable media 706 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Several modules such as instructions, data stores, and so forth may be stored within the computer-readable media 706 and configured to execute on the processors 704. For example, as illustrated, the computer-readable media 706 stores asset feature determining instructions 708 (e.g., to determine features of the asset), virtual identifier determining instructions 710 (e.g., to assign virtual identifiers to the assets), physical identifier determining instructions 712 (e.g., to assign physical identifiers to the assets), slot assigning instructions 714 (e.g., to process and assign the virtual identifier and/or physical identifier to a slot associated with a pixel map of the physical environment), pixel map generation instructions 716 (e.g., to process image data of a physical environment and generate a pixel map of slots representing the physical environment to pixels within the image data), slot determining instruction 718 (e.g., to determine a slot being occupied by an asset), image device control instruction 720 (e.g., to cause image devices to capture additional image data of an asset or slot to assist with determining the physical identities), asset location tracking instruction 722 (e.g., to track an asset via multiple image devices and the pixel map as the asset is moved within the physical environment) as well as other instructions, such as an operating system. The computer-readable media 706 may also be configured to store data, such as image data 724, machine learned models 726, asset data 728, pixel map data 730, physical environment data 732, and image device data 734 as well as other data.

The feature determining instructions 708 may be configured to determine features of the asset. For example, the feature determining instructions 708 may determine dimensions, weight, identity, damage, unit count, type or class, and the like from the image data 724. In some cases, the feature determining instructions 708 may utilize one or more of the machine learned models 726 trained on image data of assets to performing feature extraction.

The virtual identifier determining instructions 710 may be configured to assign virtual identifiers to the assets. For example, based on the output of the feature determining instructions 708, the virtual identifier determining instructions 710 may assign virtual identifiers to the assets that may be mapped to the pixel maps, an inventory record associated with the yard or facility, and the like. In some cases, the virtual identifier determining instructions 710 may assign virtual identifiers in sequence from a list of unused identifiers. The virtual identifier determining instructions 710 may include combination of characters (both letters and numbers as well as other characters).

The physical identifier determining instructions 712 may be configured to assign physical identifiers to the assets. For example, based on the output of the feature determining instructions 708, the physical identifier determining instructions 712 may determine the physical or actual identity of the assets from a manifest, inventory, record, or the like. The physical identifier determining instructions 712 may then correlate the virtual identifier to the physical identifier.

The slot assigning instructions 714 may be configured to process and assign the virtual identifier and/or physical identifier to a slot associated with a pixel map of the physical environment. For example, the slot assigning instructions 714 may assign a region of pixels within a pixel map 730 of the yard or physical environment to the virtual identifier and/or physical identifier.

The pixel map generation instructions 716 may be configured to process image data of a physical environment and generate a pixel map 730 of slots representing the physical environment to pixels within the image data. For example, the pixel map generation instructions 716 may generate a pixel map 730 with various virtual slots and/or physical regions based on physical marks (e.g., painted lines, cones, and the like) within the physical environment. The pixel map generation instructions 716 may also update the pixel map 730 in response to physical changes to the physical environment, such as moved cones, repainted lines, and the like.

The pixel map generation instructions 716 may also generate the virtual regions based on assets stored within the physical environment. For example, the pixel map generation instructions 716 may determine virtual slots based on empty or unoccupied space within the image data 724 representing the yard or facility.

The slot determining instruction 718 may be configured to determine if a slot is being occupied by an asset. For example, the slot determining instruction 718 may determine that a slot has been occupied based on a comparison of existing pixel map data 730 and incoming image data 724 from various image devices, such as the yard mule cameras. In some case, the slot determining instruction 718 may divide or redefine virtual slots within the physical environment and the pixel map data 730 based on newly detected and parked (e.g., stored) assets. For example, if a newly placed asset only occupies a portion of a virtual slot, the slot determining instruction 718 and/or the pixel map generation instructions 716 may divide the virtual slot into a first slot representing the space occupied by the newly detected asset and a second slot representing the remaining available space within the physical environment. In some cases, the slot determining instruction 718 may also assign the virtual identifier and/or physical identifier associated with the asset to the slot within the pixel map data 730.

The image device control instruction 720 may be configured to cause image devices to capture additional image data of an asset or slot to assist with determining the physical identities. For example, the image device control instruction 720 may assign a yard mule to capture an image of a slot or area that is obstructed from the fixed image devices of the system. In other cases, the image device control instruction 720 may cause a PTZ camera to zoom or otherwise focus on areas of within a field of view to provide more detailed image data with respect to a particular asset, slot, or the like.

The asset location tracking instruction 722 may be configured to track an asset via multiple image devices and the pixel map data 730 as the asset is moved within the physical environment. For example, once detected, a vehicle or asset entering the physical environment may be tracked via pixel location on various different image devices as the vehicle or asset moves through the physical environment until being delivered or stored at a particular area or region. The asset location tracking instruction 722 may facilitate tracking the vehicle or asset over multiple field of view of multiple image devices, such as based on pixel matching or counting techniques.

Figure 8:
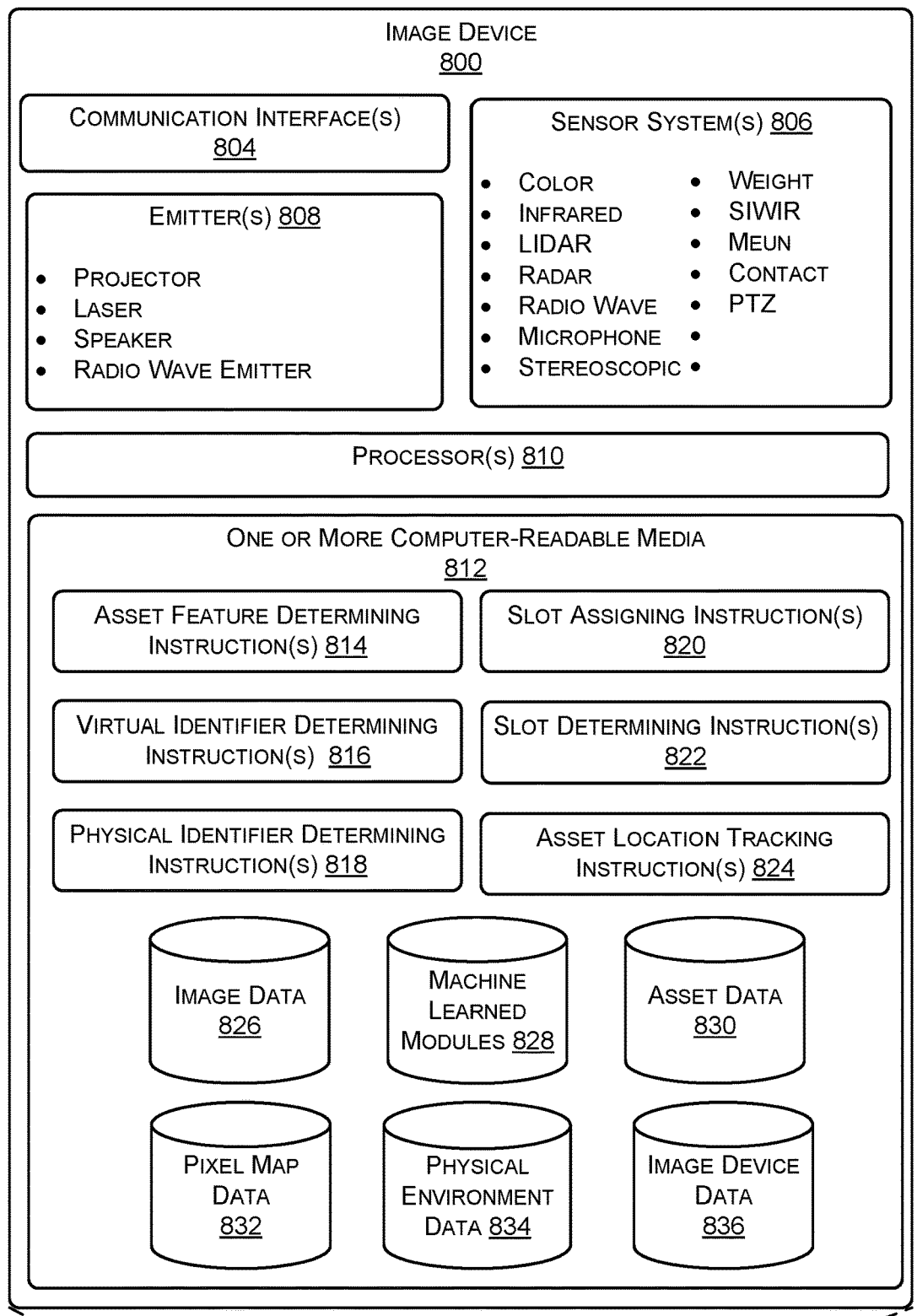

FIG. 8 is an example image device 800 that may implement the techniques described herein according to some implementations. The image device 800 may be fixed, wide view (e.g., 180 degrees, 360 degrees, or the like), a PTZ image device, a mobile image device, or the like. The image device 800 may include one or more communication interface(s) 804 (also referred to as communication devices and/or modems), one or more sensor system(s) 806, and one or more emitter(s) 808.

The image device 800 can include one or more communication interfaces(s) 804 that enable communication between the image device 800 and one or more other local or remote computing device(s) or remote services, such as a cloud-based asset tracking system of FIG. 1. For instance, the communication interface(s) 804 can facilitate communication with other image devices or facility systems. The communications interfaces(s) 804 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

The one or more sensor system(s) 806 may be configured to capture the data 830 associated with a physical environment. In at least some examples, the sensor system(s) 806 may include thermal sensors, time-of-flight sensors, location sensors, LIDAR sensors, SIWIR sensors, radar sensors, sonar sensors, infrared sensors, cameras (e.g., RGB, IR, intensity, depth, etc.), Muon sensors, microphone sensors, environmental sensors (e.g., temperature sensors, humidity sensors, light sensors, pressure sensors, etc.), PTZ cameras, and the like. In some examples, the sensor system(s) 806 may include multiple instances of each type of sensor. For instance, camera sensors may include multiple cameras disposed at various locations.

The image device 800 may also include one or more emitter(s) 808 for emitting light and/or sound. By way of example and not limitation, the emitters in this example include light, illuminators, lasers, patterns, such as an array of light, audio emitters, and the like.

The image device 800 may include one or more processors 810 and one or more computer-readable media 812. Each of the processors 810 may itself comprise one or more processors or processing cores. The computer-readable media 812 is illustrated as including memory/storage. The computer-readable media 812 may include volatile media (such as random access memory (RAM)) and/or nonvolatile media (such as read only memory (ROM), Flash memory, optical disks, magnetic disks, and so forth). The computer-readable media 812 may include fixed media (e.g., RAM, ROM, a fixed hard drive, and so on) as well as removable media (e.g., Flash memory, a removable hard drive, an optical disc, and so forth). The computer-readable media 812 may be configured in a variety of other ways as further described below.

Several modules such as instructions, data stores, and so forth may be stored within the computer-readable media 812 and configured to execute on the processors 810. For example, as illustrated, the computer-readable media 812 stores asset feature determining instructions 814 (e.g., to determine features of the asset), virtual identifier determining instructions 816 (e.g., to assign virtual identifiers to the assets), physical identifier determining instructions 818 (e.g., to assign physical identifiers to the assets), slot assigning instructions 820 (e.g., to process assign the virtual identifier and/or physical identifier to a slot associated with a pixel map of the physical environment), slot determining instruction 822 (e.g., to determine a slot being occupied by an asset), asset location tracking instruction 824 (e.g., to track an asset via multiple image devices and the pixel map as the asset is moved within the physical environment) as well as other instructions, such as an operating system, as discussed above. The computer-readable media 812 may also be configured to store data, such as image data 826, machine learned models 828, asset data 830, pixel map data 832, physical environment data 834, and image device data 836 as well as other data.

Figure 9:
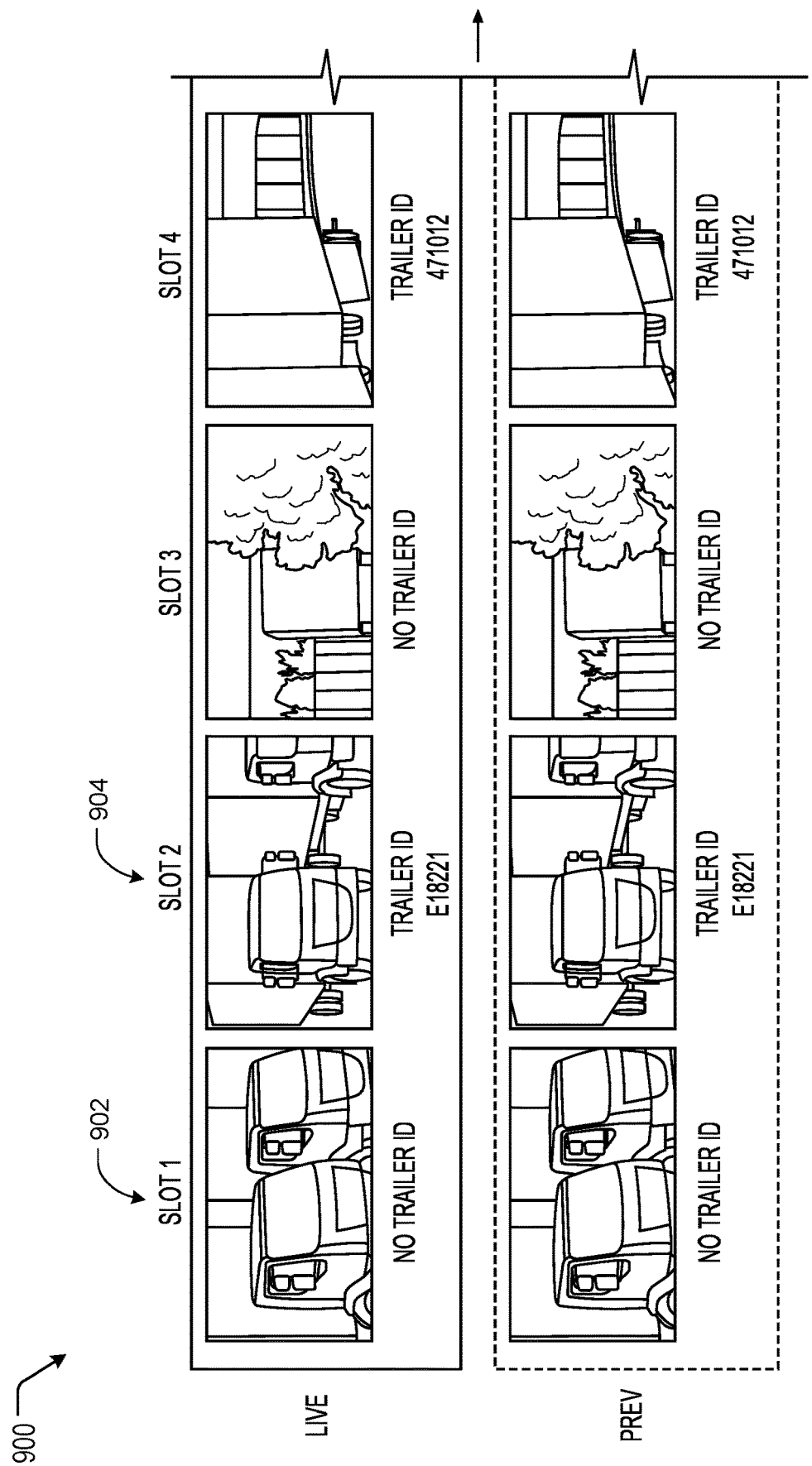
FIG. 9 is an example pictorial diagram that shows a physical environment with multiple slots that may be assigned to an asset according to some implementations.
Figure 10:
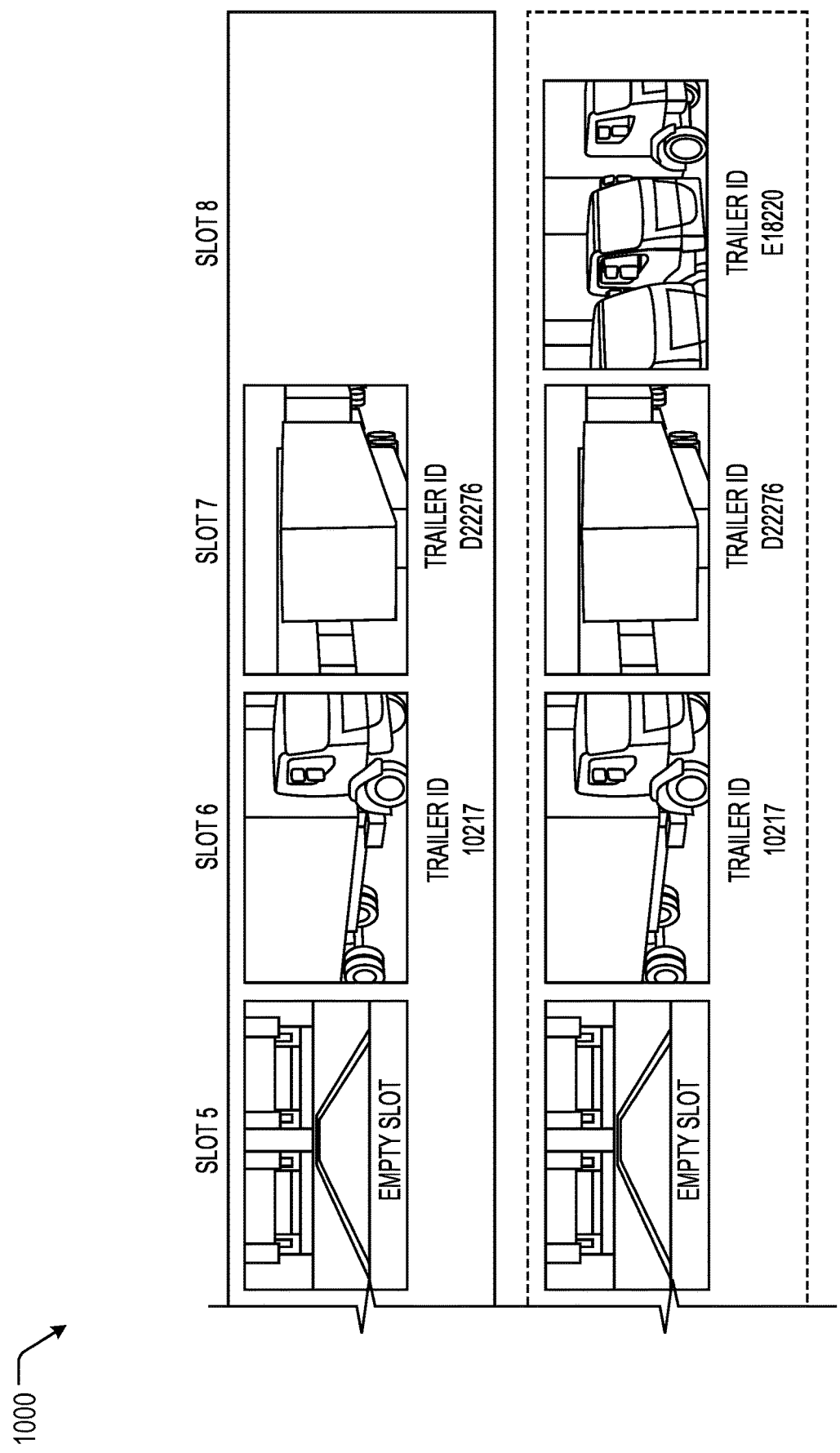
FIG. 10 is another example pictorial diagram that shows a physical environment with multiple slots that may be assigned to an asset according to some implementations.

FIGS. 9-10 are example pictorial diagrams that show a physical environment (e.g., a yard) with multiple slots that may be assigned to an asset according to some implementations. In this case the slots may be assigned for only a period in which the asset occupies the slot even if the occupancy is brief (such as a vehicle traversing through the slot to another location in the physical environment). In the current examples, the system may monitor slots 1-8 and include an assigned identifier to each slot that has an active asset or vehicle (e.g., the trail IDs as shown). In some cases, the trailer IDs may be virtual or physical identifiers, as discussed above. In these examples, the trailer ID may be updated as the trailer is moved from slot 1 to slot 2 and so forth.

Figure 11:
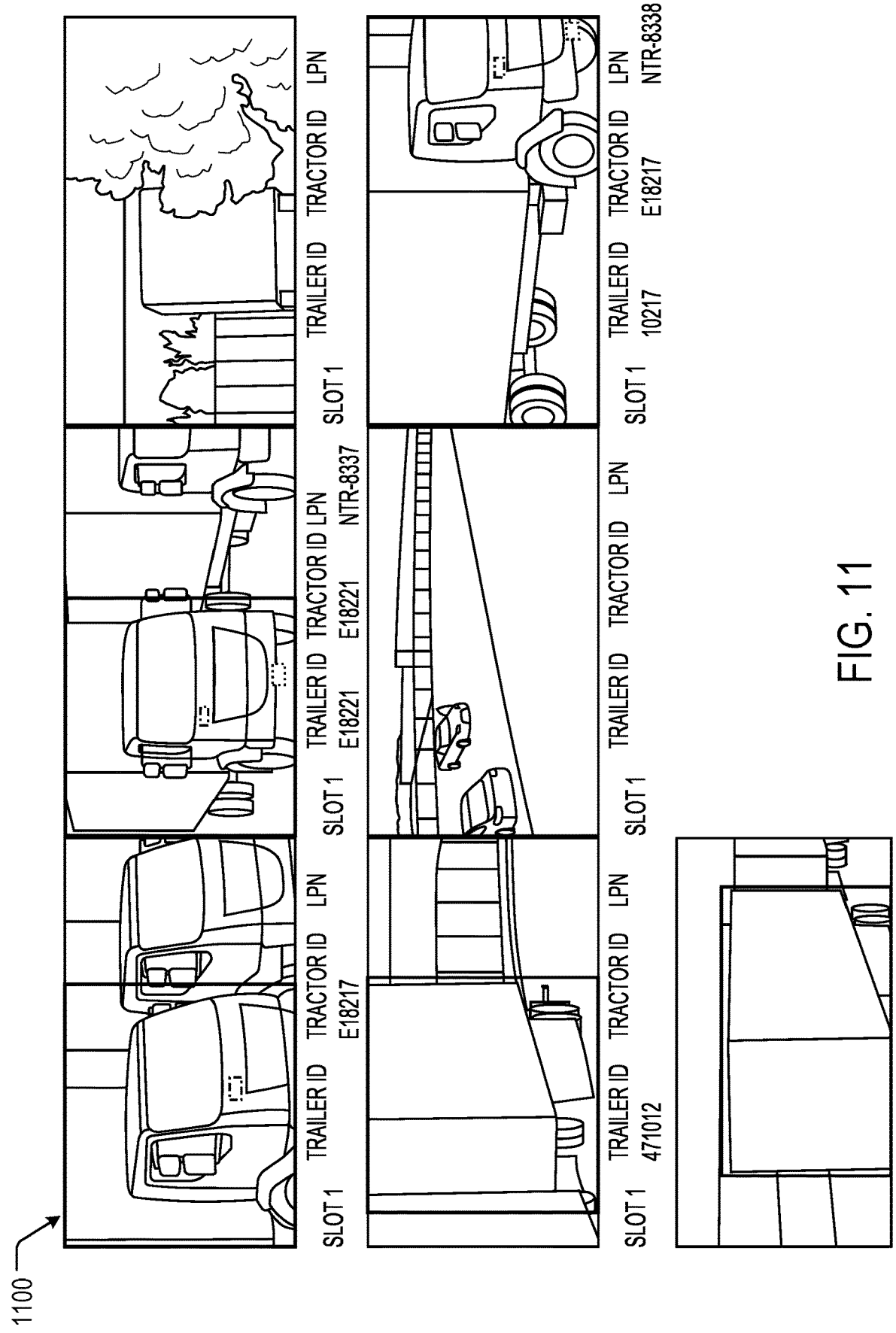
FIG. 11 is another example pictorial diagram that shows a physical environment with multiple slots that may be assigned to an asset according to some implementations.

FIG. 11 is an example pictorial diagram that show a physical environment (e.g., a yard) with multiple slots that may be assigned to an asset according to some implementations. In this case the slots may have multiple IDs such as the trailer ID and tractor ID shown in slot 1. Accordingly, it should be understood that each slot may have multiple identifiers associated with it. For example, the asset, the container, the vehicle all parked in the same slot may have individual identifiers assigned to the virtual slot within the pixel map, as all of the agents are located within the same area.

Although the discussion above sets forth example implementations of the described techniques, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

EXAMPLE CLAUSES

A. A system comprising: a first fixed image device to capture first image data associated with a physical environment; a second mobile image device to capture second image data associated with the physical environment; and an asset tracking system configure to: generate, based at least in part on the first image data, a pixel map of the physical environment, the pixel map including at least a first slot and a second slot, the first slot is defined based on a first set of pixels of the pixel map and the second slot is defined based on a second set of pixels of the pixel map, the first set of pixels different than the second set of pixels; detect, based at least in part on the first image data, an asset within the first slot; assign a virtual identifier to the asset; associate the virtual identifier with the first slot; determine, based at least in part on the second image data, a physical identifier associated with the asset; and associate the virtual identifier with the physical identifier.

B. The system of A, wherein a first image device is a pan-tilt-zoom (PTZ) image device or a 360 degree scanning image device.

C. The system of A, wherein a second image device is associated with a yard mule.

D. The system of A, wherein the first slot is a physical slot defined in the physical environment and the pixel map and the second slot is a virtual slot defined only within the pixel map.

E. The system of A, wherein the asset tracking system is further configured to: receive a request for a physical location of the asset; determine, based at least in part on the physical identifier, the virtual identifier, and the pixel map, the physical location; and output the physical location to a remote device.

F. The system of A, wherein associating the virtual identifier with the first slot further comprises determining the first slot based at least in part on a number of pixels representing the asset within the pixel map.

G. A method comprising: detecting, based at least in part on first image data, an asset within a physical environment; assigning a virtual identifier to the asset; determining, based at least in part on second image data, that the asset has been parked within the physical environment, the second image data received subsequently to the first image data; defining, based at least in part on pixels within the second image data representing the asset, a virtual slot within a pixel map of the physical environment; associating the virtual identifier with the virtual slot; and causing the pixel map to be displayed at a display associated with the physical environment, the pixel map including data indicating the virtual slot and an occupancy of the virtual slot.

H. The method of G, wherein defining the virtual slot is based at least in part on physical marks within the physical environment represented within the second image data.

I. The method of G, further comprising: determining, based at least in part on third image data of the asset, a physical identifier associated with the asset, the third image data received subsequently to the second image data; and associating the physical identifier with the virtual identifier and the virtual slot.

J. The method of I, wherein the third image data is received from a mobile image device operating within the physical environment.

K. The method of I, wherein the third image data is received from a pan-tilt-zoom image device operating within the physical environment.

L. The method of I, further comprising: receiving a request, the request including the physical identifier; determining the virtual slot based at least in part on the physical identifier; sending location data associated with the virtual slot to a remote device.

M. The method of G, further comprising determining an available capacity of the physical environment based at least in part on a dimension associated with the virtual slot.

N. The method of M, further comprising causing at least one incoming delivery to be rerouted based at least in part on the available capacity.

O. The method of G, wherein the pixel map includes a two-dimensional top down map and a three-dimensional model of the physical environment.

P. The method of G, wherein the virtual slot is a first virtual slot and the method further comprises: determining, based at least in part on third image data, that the asset has moved; defining, based at least in part on pixels within the third image data representing the asset, a second virtual slot within the pixel map of the physical environment; associating the virtual identifier with the second virtual slot; and removing the first virtual slot from the pixel map.

Q. One or more non-transitory computer-readable media storing instructions executable by one or more processors, wherein the instructions, when executed, cause the one or more processors to perform operations comprising: detecting, based at least in part on first image data, an asset within a physical environment; assigning a virtual identifier to the asset; determining, based at least in part on second image data, a region associated with the asset and within the physical environment, the second image data received subsequently to the first image data; defining, based at least in part on the second image data, a virtual slot within a pixel map of the physical environment; associating the virtual identifier with the virtual slot; and causing the pixel map to be displayed at a display associated with the physical environment, the pixel map including data indicating the virtual slot and an occupancy of the virtual slot.

R. The one or more non-transitory computer-readable media of Q, wherein the virtual slot is a first virtual slot and the operations further comprises: determining, based at least in part on third image data, that the asset has moved; defining, based at least in part on pixels within the third image data representing the asset, a second virtual slot within the pixel map of the physical environment; associating the virtual identifier with the second virtual slot; and removing the first virtual slot from the pixel map.

S. The one or more non-transitory computer-readable media of Q, wherein the operations further comprise: determining, based at least in part on third image data of the asset, a physical identifier associated with the asset, the third image data received subsequently to the second image data; and associating the physical identifier with the virtual identifier and the virtual slot.

T. The one or more non-transitory computer-readable media of Q, wherein the operations further comprise: redefining pixels associated with the virtual slot within the pixel map responsive to detecting, based at least in part on third image data, a physical marker associated with the virtual slot has changed.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   a first fixed image device to capture first image data associated with a physical environment;
   a second mobile image device to capture second image data associated with assets parked within the physical environment; and
   an asset tracking system configured to:
      generate, based at least in part on the first image data, a pixel map of the physical environment, the pixel map including at least a first slot and a second slot, the first slot is defined based on a first set of pixels of the pixel map and the second slot is defined based on a second set of pixels of the pixel map, the first set of pixels different than the second set of pixels;
      detect, based at least in part on the first image data, a first asset within the first slot;
      assign a virtual identifier to the first asset;
      associate the virtual identifier with the first slot, wherein the first slot is a first virtual slot;
      determine, based at least in part on portions of the second image data captured while the first asset is positioned within the first slot, a physical identifier associated with the first asset;
      associate the virtual identifier with the physical identifier;
      determining, based at least in part on third image data, that the first asset has moved;
      defining, based at least in part on pixels within the third image data representing the first asset, a second virtual slot within the pixel map of the physical environment;
      associating the virtual identifier with the second virtual slot; and
      removing the first virtual slot from the pixel map.

2. The system of claim 1, wherein a first image device is a pan-tilt-zoom (PTZ) image device or a 360 degree scanning image device and a second image device is mounted on a yard mule having a front end, a rear end, a left side, and a right side and wherein the second image device is mounted on the yard mule such that the second image device may capture image data to at least one of the left side or the right side of the yard mule.

3. The system of claim 1, wherein the first slot is a physical slot defined in the physical environment and the pixel map and the second slot is a virtual slot defined only within the pixel map.

4. The system of claim 1, wherein associating the virtual identifier with the first slot further comprises defining an area of the pixel map associated with the first slot based at least in part on a number of pixels representing the first asset within the pixel map.

5. A method comprising:
   detecting, based at least in part on first image data, an asset within a physical environment;
   assigning a virtual identifier to the asset;
   determining, based at least in part on second image data, that the asset has been parked within the physical environment, the second image data received subsequently to the first image data;
   defining, in response to determining that the asset has been parked based at least in part on pixels within the second image data representing the asset, a virtual slot within a pixel map of the physical environment;
   associating the virtual identifier with the virtual slot, wherein the virtual slot is a first virtual slot; and
   causing the pixel map to be displayed at a display associated with the physical environment, the pixel map including data indicating the virtual slot and an occupancy of the virtual slot;
   determining, based at least in part on third image data, that the asset has moved;
   defining, based at least in part on pixels within the third image data representing the asset, a second virtual slot within the pixel map of the physical environment;
   associating the virtual identifier with the second virtual slot; and
   removing the first virtual slot from the pixel map.

6. The method of claim 5, wherein defining the virtual slot is based at least in part on physical marks within the physical environment represented within the second image data.

7. The method of claim 5, further comprising:
   determining, based at least in part on third image data of the asset, a physical identifier associated with the asset, the third image data received subsequently to the second image data; and
   associating the physical identifier with the virtual identifier and the virtual slot.

8. The method of claim 7, wherein the third image data is received from a mobile image device operating within the physical environment.

9. The method of claim 7, wherein the third image data is received from a pan-tilt-zoom image device operating within the physical environment.

10. The method of claim 5, further comprising:
    receiving a request, the request including a physical identifier associated with an asset;
    determining the virtual slot based at least in part on the physical identifier; and
    sending location data associated with the virtual slot to a remote device.

11. The method of claim 10, further comprising determining an available capacity of the physical environment based at least in part on a dimension associated with the virtual slot.

12. The method of claim 11, further comprising causing at least one incoming delivery to be rerouted based at least in part on the available capacity.

13. The method of claim 5, wherein the pixel map includes a two-dimensional top down map and a three-dimensional model of the physical environment.

14. One or more non-transitory computer-readable media storing instructions that, when executed by one or more processors, cause the one or more processors to perform operations comprising:
    detecting, based at least in part on first image data, an asset within a physical environment;
    assigning a virtual identifier to the asset;
    determining, based at least in part on second image data, that the asset has been parked within the physical environment, the second image data received subsequently to the first image data;
    determining, based at least in part on second image data, that the asset has been parked within the physical environment for greater than a predetermined period of time, the second image data received subsequently to the first image data;
    defining, responsive to determining that the asset has been parked within the physical environment for greater than the predetermined period of time and based at least in part on pixels within the second image data representing the asset, a virtual slot within a pixel map of the physical environment;
    associating the virtual identifier with the virtual slot, wherein the virtual slot is a first virtual slot; and
    causing the pixel map to be displayed at a display associated with the physical environment, the pixel map including data indicating the virtual slot and an occupancy of the virtual slot;
    determining, based at least in part on third image data, that the asset has moved;
    defining, based at least in part on pixels within the third image data representing the asset, a second virtual slot within the pixel map of the physical environment;
    associating the virtual identifier with the second virtual slot; and
    removing the first virtual slot from the pixel map.

15. The one or more non-transitory computer-readable media of claim 14, wherein the operations further comprise:
    determining, based at least in part on third image data of the asset, a physical identifier associated with the asset, the third image data received subsequently to the second image data; and
    associating the physical identifier with the virtual identifier and the virtual slot.

16. The one or more non-transitory computer-readable media of claim 15, wherein the third image data is received from a mobile image device operating within the physical environment.

17. The one or more non-transitory computer-readable media of claim 15, wherein the third image data is received from a pan-tilt-zoom image device operating within the physical environment.

18. The one or more non-transitory computer-readable media of claim 15, wherein the operations further comprise:
    receiving a request, the request including the physical identifier;
    determining the virtual slot based at least in part on the physical identifier;
    determining an available capacity of the physical environment based at least in part on a dimension associated with the virtual slot; and causing at least one incoming delivery to be rerouted based at least in part on the available capacity.

\* \* \* \* \*